Patented May 8, 1934

1,957,488

UNITED STATES PATENT OFFICE 1,957,488

ACID INHIBITOR

William S. Calcott, Penns Grove, N. J., and Ira E. Lee, Wilmington, Del., and Louis S. Bake, Penns Grove, N. J., assignors to E. I. du Pont de Nemours & Company, Wilmington, Del., a corporation of Delaware No Drawing. Application June 21, 1929, Serial No. 372,793

36 Claims. (Cl. 148—8)

This invention relates to the inhibition of the solvent action of acids upon metals, while permitting the acid to act upon the corrosion products of the metals, thus permitting the removal of such corrosion products from a metallic surface with the minimum loss of valuable free metal. More particularly, our invention relates to a novel class of inhibitors and to the product formed by the addition of one or more members of that class to a pickling acid.

It is known that certain types of substances have been used as inhibitors in pickling baths and in pickling acid solutions such as, for example, the acid extract of coal, sulfonation products of slaugher house waste, sludges from the sulfuric acid treatment of coal tar or petroleum, mouldy flour, glue, carbazole, pyridine, aniline and di-ortho-tolyl-thiourea. Various disadvantages are connected with the use of such substances as inhibitors. For example, some of the substances are very unstable in the acid used, particularly in more concentrated solutions of acid. In others the inhibiting action possessed by the substance is weak.

Our invention has for one of its objects the preparation of a pickling acid solution in which the inhibitor is quite stable in the acid, even where the acid is of high concentration. A further object of our invention is the preparation of pickling acid solutions which can be prepared by the addition of the inhibitor to a concentrated acid and shipped as such without destruction of the inhibitor and needing no further attention other than dilution to the proper strength for use in the pickling bath. An added object of our invention is a preparation of a pickling solution in which the inhibitor is of great efficiency. Other objects will appear to those skilled in the art as the following description proceeds.

In one of its broad aspects our invention consists in the preparation of a pickling acid solution containing a product made by the combination of an amine, an aldehyde and carbon bisulfide, preferably where the combination of the ingredients has taken place under conditions which do not permit the evolution of hydrogen sulfide. Examples of the products falling within our invention are as follows:

Example 1

310 pounds of butyr-aldehyde are slowly added in a closed system to 100 pounds of aniline in a kettle equipped with a jacket, a coil for heating and cooling, and an agitator. The temperature is kept below 50° C. during the addition of the butyr-aldehyde. The mixture is then slowly heated to 120° C. and held there for one hour. The water formed is then allowed to separate and drawn off, after which the product is cooled to 30° C. and 80 pounds of carbon bisulfide then added. The temperature is raised to 80° C. and held at this point for one and one-half hours. At the end of this time the product is cooled to 50° C. and any unreacted volatile matter is drawn off under vacuum. The remaining oil when added to a pickling acid we have found to be an excellent acid inhibitor.

Example 2

285 pounds of heptaldehyde and 180 pounds of butyr-aldehyde are reacted with 92 pounds of aniline. When this reaction is complete the mixture is heated to 140° C. and the water formed is drawn off, after which the product is cooled to 30° C. and reacted with 80 pounds of carbon bisulfide. The oil treated after the removal of any unreacted volatile matter is found to be an excellent acid inhibitor.

Example 3

930 pounds of butyr-aldehyde are reacted with 50 pounds of a 40% aqueous solution of methyl amine. After the removal of water the condensation product is reacted with 130 pounds of carbon bisulfide. When freed from volatile impurities, the product may be added to a pickling acid.

Example 4

Benzaldehyde is reacted with normal butyl amine and the product is then reacted with carbon bisulfide. It is possible in this instance as in other examples to permit the reaction of carbon bisulfide upon the amine and subsequently to cause the resulting product to react with the aldehyde.

Example 5

To 215 pounds of melted para-toluidine 100 pounds of carbon bisulfide are slowly added under a reflux condenser. 450 pounds of butyr-aldehyde are then slowly added and the resulting product heated under moderate pressure for three hours at 130° C. As in the other examples, the conditions of reactions are such that the evolution of hydrogen sulfide is prevented.

Example 6

100 pounds of carbon bisulfide are slowly added to 200 pounds of aniline, with cooling. After the completion of the reaction 1,000 pounds of heptaldehyde are added below the surface of the carbon bisulfide aniline reaction product, also with cooling. The resulting product is then heated in a closed vessel for three hours at 125° C., and may thereafter be purified by distilling off any unreacted volatile material under vacuum. The product obtained will be found to be an excellent acid inhibitor.

Example 7

2 moles of aniline are added slowly to 2 moles of acetaldehyde, held at about 42 or 43° C. over a period of thirty minutes. The temperature of the mixture is then raised to 60° C. and held at this temperature for two hours, after which it is subjected to steam distillation to remove any unreacted aniline. 2 moles of carbon bisulfide are then added, and the mixture refluxed for ten hours at 50° C. The product is then dried under vacuum at about 65° C. It will be found to be a most excellent acid inhibitor as will the product formed by the inter-action of 4 moles of butyr-aldehyde, 1 mole of aniline and 1 mole of carbon bisulfide, as well as the product formed by the inter-action of 2 moles of acetaldehyde, 2 moles of aniline, and 3 moles of carbon bisulfide.

We wish it to be understood that the products mentioned hereabove are listed merely for the purpose of giving examples of our invention. We may also use products obtained by the interaction of secondary amines, an aldehyde and carbon bisulfide. For example, if pyridine be combined with an aldehyde such as formaldehyde or its polymeric form, p-formaldehyde, a reaction takes place which may be carried out either in the presence of a suitable solvent or without a solvent. The oily liquid obtained will react with carbon bisulfide to produce a product that is oily in nature but which may be obtained in crystalline form by seeding with crystals, or otherwise suitably treating. Products may be obtained similarly by the reaction of aldehydes on other secondary amines such as, for example, a di-alkyl amine such as di-ethyl amine or di-butyl amine. Aromatic secondary amines, such as di-benzyl amine, di-phenyl amine, phenyl-alpha-naphthylamine or phenyl-beta-naphthylamine may be employed.

The products which we may use as acid inhibitors may be made from either primary or secondary amines and either aliphatic or aromatic amines.

The exact conditions as to ratio of aldehyde, amine and carbon bisulfide can, of course, be varied and different ratios may be found preferable with different amines and aldehydes. It is possible, also, to use more than one aldehyde in the preparation of these inhibitors. The order of addition of the aldehyde, amine, and carbon bisulfide may be varied. Thus, the aldehyde and amine may be first reacted together and then to the condensation product formed thereby may be added the carbon bisulfide. On the other hand, carbon bisulfide and aldehyde may be mixed together and then at a second stage in the manufacture the amine may be added. As a third alternative, the carbon bisulfide may be added to the amine as in Example 6, and to the reaction product formed thereby may be added the aldehyde.

In general, our invention is concerned with products obtained by the reaction of either primary or secondary amines, which may be either aliphatic or aromatic, with aldehydes which may be either aliphatic or aromatic, and with carbon bisulfide. We do not wish to unduly limit ourselves as to any amounts, but we prefer products formed by the inter-action of the constituents in the following ratios: for every mole of amine between 1 and 5 moles of aldehyde, and between 0.5 and 3 moles of carbon bisulfide.

We have found that the products falling within the class described above have excellent properties as inhibitors in the acid treatment of metals, in that when added to a pickling acid they permit the acid to dissolve oxides, salts and corrosion products of the metal without attacking the free metal.

It is to be understood that by pickling acid we mean non-oxidizing acids and specifically non-oxidizing mineral acids such as, for example, sulfuric acid, hydrochloric acid and their equivalents. Where in the specification and claims we have used the expression concentrated acid, we wish to be understood as meaning acid of the concentration normally employed commercially such as, for example, in the case of sulfuric acid, an acid above 75% or above 90%, and when expressed in terms of degrees Bé. acid in the neighborhood of 60–66° Bé. (determined at 20° C.) With respect to hydrochloric acid, we wish the expression concentrated acid to mean acid between 18 and 20° Bé., which is of a percentage concentration of around 30–32% hydrochloric acid.

When any one of the herein described class of products is added to a pickling acid, which is diluted to a strength suitable for the acid treatment of metals to remove corrosion products, etc., a very effective inhibition with respect to dissolving the free metal results if a small quantity of the inhibitor has been added, say from 0.2 to 10 parts of inhibitor to 100 parts of acid. Following will be found some examples of the acid treatment of metals. In each of the following examples a weighed amount of metal was placed in a solution of 6% sulfuric acid and the temperature of the acid raised to 90° C. One volume of acid was used as a check, and to another volume was added varying amounts of inhibitor. In the second example, 0.005% of inhibitor made from the inter-action of 4 moles of acetaldehyde, 1½ moles of carbon bisulfide and 1 mole of aniline were added to the dilute acid. The metal subjected to the acid in the presence of the inhibitor lost far less weight than when subjected to the acid without the inhibitor. It will be seen that the unmodified acid dissolved 100 parts of free metal, while the acid containing the inhibitor dissolved only .4 parts of free metal, so that the inhibitor was effective to the extent of 99.6%. In the following table, in each of the examples the inhibitor is formed from the interaction of 1 mole of aniline and 1½ moles of carbon bisulfide, together with the indicated quantity of the indicated aldehyde.

| Aldehyde used kind | Mols | Amt. of inhibitor used | Temperature | Kind and strength of the acid used | Kind of metal | Inhibition |
|---|---|---|---|---|---|---|
| | | Percent | °C. | | | Percent |
| Butyr- | 3.5 | 0.005 | 90 | 6% H₂SO₄ | Mild steel | 54.0 |
| Acet- | 4.0 | 0.005 | 90 | 6% H₂SO₄ | ...do... | 99.6 |
| Acet- | 1.0 | 0.005 | 90 | 6% H₂SO₄ | ...do... | 98.2 |
| Acet- | 2.0 | 0.005 | 90 | 6% H₂SO₄ | ...do... | 99.5 |
| Acet- | 2.0 | 0.005 | 47 | 15% HCl | Hard steel | 97.2 |
| Acet- | 2.0 | 0.01 | 47 | ...do... | ...do... | 98.0 |
| Acet- | 2.0 | 0.01 | 47 | 8.2% HCl | ...do... | 97.9 |
| Croton- | 3.5 | 0.005 | 90 | 6% H₂SO₄ | Mild steel | 94.1 |
| Hept- | 2.0 | 0.005 | 90 | ...do... | ...do... | 89.0 |
| Furfur- | 4.0 | 0.01 | 90 | ...do... | ...do... | 71.6 |
| Form- | 0.2 | 0.01 | 90 | ...do... | ...do... | 95.2 |

The inhibiting action of the compounds we have described above varies of course, with the concentration of the inhibitor, the strength and kind of acid employed, as well as the temperature of the acid solution, but in any case the inhibition is quite marked. Although we have referred to pickling acids and the pickling of metals, it will be understood that our invention is not limited to the so-called pickling treatment of metals. Acid solutions containing our inhibitors may be used in the treatment of pipe systems for the removal of accumulated rust and oxidation products, as well as in the treatment of any metal the surface of which has been covered with a corrosion product or oxidation product which it is desired to remove by means of an acid. The removal of mill scale and the preparation of metals for electroplating and galvanizing are examples of operations in which our inhibitor may be effectively employed. We have found that inhibitors of the class described possess unusual stability in concentrated pickling acids.

Heretofore it has been customary to add the inhibitor to the pickling acid solution just prior to the acid treatment of metals, and after the pickling acid has been diluted to the strength necessary for such treatment. Inhibitors known to the prior art heretofore have been unstable and have been decomposed when added directly to the concentrated pickling acid.

Our inhibitors are quite stable in concentrated pickling acids and, in fact, we have found it desirable to add them directly to the concentrated pickling acid before it is diluted to the desired strength for subsequent metal treatment. Compounds falling within the class described when added to concentrated pickling acids and stored for an appreciable time under ordinary conditions of atmosphere and pressure, such as eight or more days, show no diminution of their inhibiting qualities. Even when added to 66° Bé. sulfuric acid, our inhibitors dissolve readily and retain their inhibiting strength when allowed to stand indefinitely in the concentrated acid.

The stability and effectiveness of our inhibitors has made it possible to prepare solutions of concentrated acid containing an inhibitor which may be shipped directly to the consumer, who need only dilute the acid to the proper strength in order to have at his disposal a pickling acid solution which will readily attack corrosion products with a minimum loss of free metal.

As many apparently widely different embodiments of this invention may be made without departing from the spirit thereof, it is to be understood that we do not limit ourselves to the foregoing examples or descriptions except as indicated in the following patent claims:

We claim:

1. A pickling acid solution for cleaning or pickling metals which contains a compound obtainable by the chemical combination of an aldehyde, an amine of the group consisting of primary and secondary amines, and carbon bisulfide.

2. A pickling acid solution for cleaning or pickling metals which contains a compound obtainable by the chemical combination of an aldehyde, a primary amine and carbon bisulfide.

3. A pickling acid solution for cleaning or pickling metals which contains a compound obtainable by the chemical combination of an aldehyde, a primary aromatic amine and carbon bisulfide.

4. A pickling acid solution for cleaning or pickling metals which contains a compound obtainable by the chemical combination of an aldehyde, aniline and carbon bisulfide.

5. A pickling acid solution for cleaning or pickling metals which contains a compound obtainable by the chemical combination of an aliphatic aldehyde, a primary aromatic amine, and carbon bisulfide.

6. A pickling acid solution for cleaning or pickling metals which contains a compound obtainable by the chemical combination of one mole of an amine of the group consisting of primary and secondary amines, between one and five moles of an aldehyde and between 0.5 and three moles of carbon bisulfide.

7. A pickling acid solution for cleaning or pickling metals which contains a compound obtainable by the chemical combination of one mole of an aromatic amine of the group consisting of primary and secondary amines, between one and five moles of an aliphatic aldehyde, and between 0.5 and three moles of carbon bisulfide.

8. A composition of matter comprising a concentrated non-oxidizing mineral acid in which is dispersed a compound obtainable by the chemical combination of an aldehyde, an amine of the group consisting of primary and secondary amines, and a carbon bisulfide.

9. A composition of matter comprising a concentrated non-oxidizing mineral acid in which is dispersed a compound obtainable by the chemical combination of 1 mole of aniline, between 1 and 5 moles of acetaldehyde, and between 0.5 and 3 moles of carbon bisulfide.

10. A pickling acid solution for cleaning or pickling metals which contains a compound obtainable by the chemical combination of between 0.5 and three moles of carbon bisulfide with the condensation product of between one and five moles of an aldehyde and one mole of an amine of the group consisting of primary and secondary amines.

11. A pickling acid solution for cleaning or pickling metals which contains a compound obtainable by the chemical combination of between 0.5 and three moles of carbon bisulfide with the condensation product of between one and five moles of an aldehyde and one mole of a primary amine.

12. A pickling acid solution for cleaning or pickling metals which contains a compound obtainable by the chemical combination of between 0.5 and three moles of carbon bisulfide with the condensation product of between one and five moles of an aldehyde and one mole of an aromatic amine of the group consisting of primary and secondary amines.

13. A pickling acid solution for cleaning or pickling metals which contains a compound obtainable by the chemical combination of between 0.5 and three moles of carbon bisulfide with the condensation product of between one and five moles of an aldehyde and one mole of a primary aromatic amine.

14. A pickling acid solution for cleaning or pickling metals which contains a compound obtainable by the chemical combination of between 0.5 and three moles of carbon bisulfide with the condensation product of between one and five moles of an aldehyde and one mole of aniline.

15. A pickling acid solution for cleaning or pickling metals which contains a compound obtainable by the chemical combination of between 0.5 and three moles of carbon bisulfide with the condensation product of between one and five moles of an aliphatic aldehyde and one mole of an amine of the group consisting of primary and secondary amines.

16. A pickling acid solution for cleaning or pickling metals which contains a compound obtainable by the chemical combination of between 0.5 and three moles of carbon bisulfide with the condensation product of between one and five moles of an aliphatic aldehyde and one mole of a primary amine.

17. A pickling acid solution for cleaning or pickling metals which contains a compound obtainable by the chemical combination of between 0.5 and three moles of carbon bisulfide with the condensation product of between one and five moles of an aliphatic aldehyde and one mole of an aromatic amine of the group consisting of primary and secondary amines.

18. A pickling acid solution for cleaning or pickling metals which contains a compound obtainable by the chemical combination of between 0.5 and three moles of carbon bisulfide with the condensation product of between one and five moles of an aliphatic aldehyde and one mole of a primary aromatic amine.

19. A pickling acid solution for cleaning or pickling metals which contains a compound obtainable by the chemical combination of between 0.5 and three moles of carbon bisulfide with the condensation product of between one and five moles of an aliphatic aldehyde and one mole of aniline.

20. A pickling acid solution for cleaning or pickling metals which contains a compound obtainable by the chemical combination of between 0.5 and three moles of carbon bisulfide with the condensation product of between one and five moles of acetaldehyde and one mole of an amine of the group consisting of primary and secondary amines.

21. A pickling acid solution for cleaning or pickling metals which contains a compound obtainable by the chemical combination of between 0.5 and three moles of carbon bisulfide with the condensation product of between one and five moles of acetaldehyde and one mole of a primary amine.

22. A pickling acid solution for cleaning or pickling metals which contains a compound obtainable by the chemical combination of between 0.5 and three moles of carbon bisulfide with the condensation product of between one and five moles of acetaldehyde and one mole of an aromatic amine of the group consisting of primary and secondary amines.

23. A pickling acid solution for cleaning or pickling metals which contains a compound obtainable by the chemical combination of between 0.5 and three moles of carbon bisulfide with the condensation product of between one and five moles of acetaldehyde and one mole of a primary aromatic amine.

24. A pickling acid solution for cleaning or pickling metals which contains a compound obtainable by the chemical combination of between 0.5 and three moles of carbon bisulfide with the condensation product of between one and five moles of acetaldehyde and one mole of aniline.

25. A pickling acid solution for cleaning or pickling metals which contains a compound obtainable by the chemical combination of one mole of carbon bisulfide with the condensation product of one mole of acetaldehyde and one mole of aniline.

26. A composition of matter comprising a concentrated non-oxidizing mineral acid in which is dispersed a compound obtainable by the chemical combination of between 0.5 and three moles of carbon bisulfide with the condensation product of between one and five moles of an aldehyde and one mole of an amine of the group consisting of primary and secondary amines.

27. A composition of matter comprising a concentrated non-oxidizing mineral acid in which is dispersed a compound obtainable by the chemical combination of between 0.5 to three moles of carbon bisulfide with the condensation product of between one and five moles of an aliphatic aldehyde and one mole of an amine of the group consisting of primary and secondary amines.

28. A composition of matter comprising a concentrated non-oxidizing mineral acid in which is dispersed a compound obtainable by the chemical combination of between 0.5 to three moles of carbon bisulfide with the condensation product of between one and five moles of an aliphatic aldehyde and one mole of a primary amine.

29. A composition of matter comprising a concentrated non-oxidizing mineral acid in which is dispersed a compound obtainable by the chemical combination of between 0.5 to three moles of carbon bisulfide with the condensation product of between one and five moles of an aliphatic aldehyde and one mole of an aromatic amine of the group consisting of primary and secondary amines.

30. A composition of matter comprising a concentrated non-oxidizing mineral acid in which is dispersed a compound obtainable by the chemical combination of between 0.5 to three moles of carbon bisulfide with the condensation product of between one and five moles of an aliphatic aldehyde and one mole of a primary aromatic amine.

31. A composition of matter comprising a concentrated non-oxidizing mineral acid in which is dispersed a compound obtainable by the chemical combination of between 0.5 to three moles of carbon bisulfide with the condensation product of between one and five moles of an aliphatic aldehyde and one mole of aniline.

32. A composition of matter comprising a concentrated non-oxidizing mineral acid in which is dispersed a compound obtainable by the chemical combination of between 0.5 to three moles of carbon bisulfide with the condensation product of between one and five moles of acetaldehyde and one mole of aniline.

33. In the process of preparing a pickling solution the step which comprises adding to a concentrated non-oxidizing mineral acid a compound obtainable by the chemical combination of an aldehyde, an amine of the group consisting of primary and secondary amines, and carbon bisulfide, and then diluting the solution to the desired strength for pickling metal and so that the diluted solution contains about 0.005% of the compound.

34. In the process of preparing a pickling solution, the steps which comprise adding to a concentrated non-oxidizing mineral acid a compound obtainable by the chemical combination of between 0.5 to three moles of carbon bisulfide with the condensation product of between one and five moles of an aliphatic aldehyde and one mole of an amine of the group consisting of primary and secondary amines, and then diluting to the desired strength for pickling metal and so that the diluted solution contains about 0.005% of the compound.

35. In the process of preparing a pickling solution, the steps which comprise adding to a concentrated non-oxidizing mineral acid a compound obtainable by the chemical combination of between 0.5 to three moles of carbon bisulfide with the condensation product of between one and five moles of an aliphatic aldehyde and one mole of a primary aromatic amine, and then diluting to the desired strength for pickling metal and so that the diluted solution contains about 0.005% of the compound.

36. In the process of preparing a pickling solution, the steps which comprise adding to a concentrated non-oxidizing mineral acid a compound obtainable by the chemical combination of between 0.5 to three moles of carbon bisulfide with the condensation product of between one and five moles of an aliphatic aldehyde and one mole of aniline, and then diluting to the desired strength for pickling metal and so that the diluted solution contains about 0.005% of the compound.

WILLIAM S. CALCOTT.
IRA E. LEE.
LOUIS S. BAKE.